Patented Apr. 24, 1951

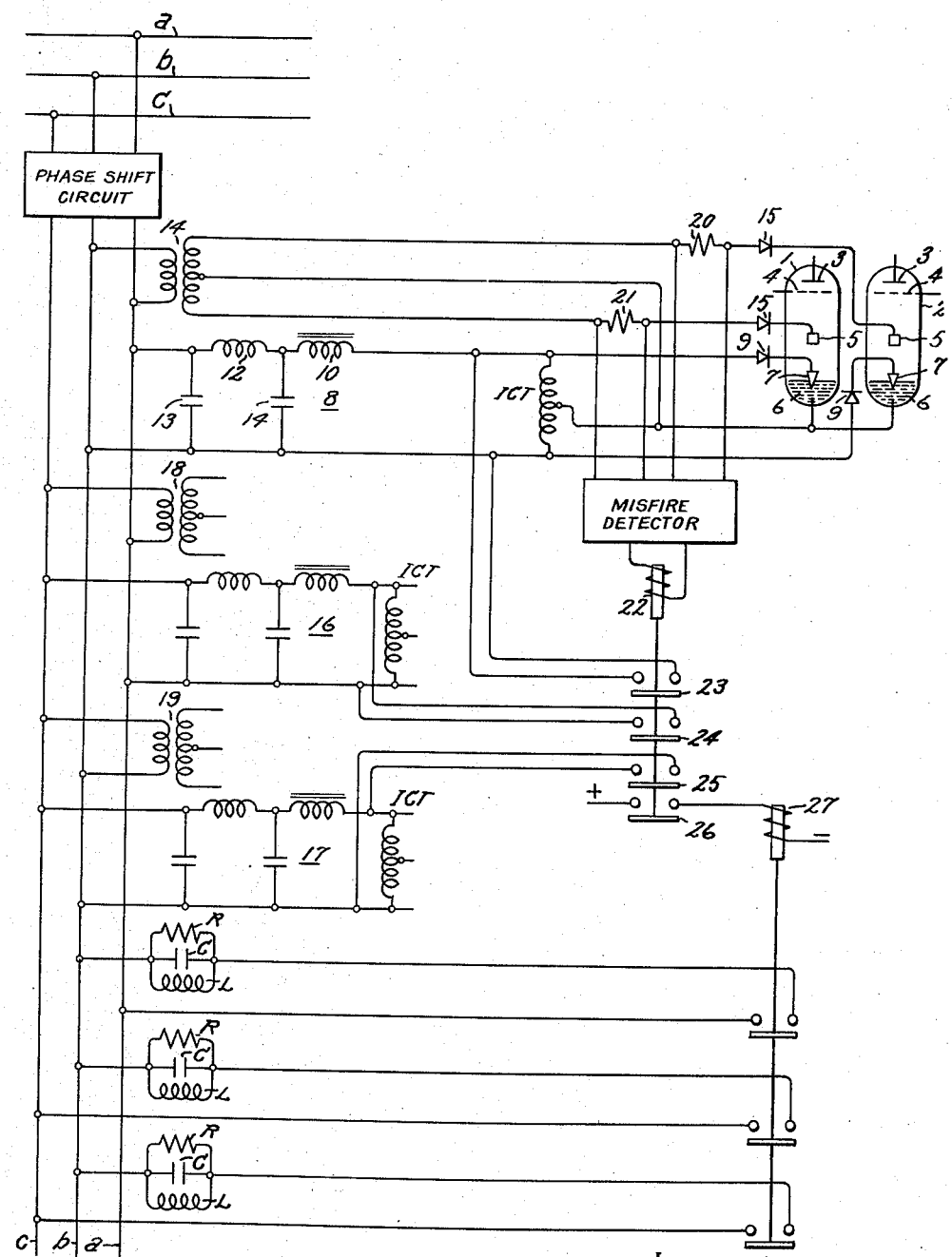

2,550,477

UNITED STATES PATENT OFFICE 2,550,477

STABILIZED ARC SUPPRESSING SYSTEM FOR ELECTRONIC DEVICES

Carl C. Herskind and Marvin J. Mulhern, Schenectady, N. Y., assignors to General Electric Company, a corporation of New York Application October 26, 1950, Serial No. 192,302

3 Claims. (Cl. 315—363)

This invention relates to stabilized arc suppressing systems for electronic devices, and more particularly to an arrangement for maintaining properly balanced voltage and phase relationships in excitation circuits for electronic devices of the ignitron type during the periods when such circuits are blocked to prevent conduction under particular service and fault conditions.

In Price application, Serial No. 84,208, filed March 29, 1949, and assigned to the assignee of this invention, a phase shift circuit is disclosed which is capable of wide angle phase shift, which is characterized by low losses, and which is capable of maintaining a substantially constant output voltage over substantially the entire range of phase shift. In the above Price application, the load which is energized by the phase shift circuit must be characterized in certain particulars in order for the phase shift arrangement to function properly. For example, it is necessary that the load circuit be characterized by a substantially constant impedance and furthermore, it is necessary that the power factor angle of the load circuit be leading and be one half of the input angle of the voltage supplying energy to the phase shift circuit. In the above Price disclosure the load circuit is disclosed as being an ignitor firing circuit for ignitron valves.

Electronic devices, such as ignitrons may be rendered non-conductive by short-circuiting the firing circuit supplying energy to the ignitor elements immersed in a mercury pool cathode, for example. One arrangement for detecting misfire conditions in electric valves of the ignitron type is disclosed in Mittag application, Serial No. 778,593, filed October 8, 1947, now Patent #2,544,345, and assigned to the assignee of this application. Thus, where a misfire condition is detected in accordance with the above mentioned Mittag disclosure, and where suitable short-circuiting means responsive to the misfire condition is applied to the ignitor firing circuits, the impedance of the firing circuit, together with its power factor, will be altered materially. Thus where short-circuiting of ignitor firing circuits is used as a means for rendering electronic valves of the ignitron type non-conductive, a phase shift circuit such as is disclosed in the above mentioned Price application does not function properly because the impedance and power-factor angle of the firing circuit are altered when the shirt circuit is applied thereto. The disturbance caused by the short circuit has a tendency to persist even after the short circuit is removed, so that an appreciable time is required for normal conditions to be restored. Ordinarily, the effect of such a short circuit is to cause a change in the voltage and phase relationships in such a way that the ignitor firing time is advanced and as a result the current through the ignitron is increased to an undesired value.

An object of this invention is to provide an improved arc suppressing arrangement for use in conjunction with electronic devices of the ignitron type which arrangement is effective to restore the ignitrons to normal operation within a very short interval of time after the arc suppressing period is terminated.

In accordance with the invention, means responsive to misfire conditions is utilized to render the ignitor firing circuits ineffective to establish a cathode spot within the ignitron tubes thereby to render the ignitrons non-conductive, and in addition, the means responsive to misfire conditions causes a load, which has characteristics similar to those of the ignitron firing circuit, to be connected to the source of energy for the firing circuits. In this way, stable voltage and phase conditions are maintained, so that when the firing circuits are re-energized, normal operation is restored promptly.

The invention will be better understood with reference to the accompanying drawing, in which the single figure thereof represents a schematic arrangement embodying the invention.

With reference to Fig. 1, ignitron tubes 1 and 2 are connected with a polyphase circuit represented by the conductors $a$, $b$ and $c$. It will be understood that in a 3 phase arrangement, such as is disclosed, six tubes such as 1 and 2 would be required. For simplicity we have shown only the two tubes such as 1 and 2 which are associated with conductors $a$ and $b$. Each of the tubes 1 and 2 is provided with a plate element 3, a control grid 4, an auxiliary or holding anode 5, a mercury pool cathode 6, and an ignitor element 7. Ignitor elements 7 are energized by circuit means in the form of the ignitor firing circuit, generally designated by the numeral 8, which in turn is energized from the phase shift circuit indicated by a block diagram. The phase shift circuit indicated by the block diagram could be the circuit disclosed in the Price application, Serial No. 84,208, referred to above.

Circuit means 8 includes an ignitor coupling transformer ICT which is used to energize ignitors 7 through unidirectional conducting devices 9 in known manner. Transformer ICT is connected to be energized from conductors $a$ and $b$ through non-linear reactor 10, and through linear reactor 12. Capacitors 13 and 14 are arranged as is indicated. Thus energy supplied through the phase shift circuit will cause a charge to accumulate on capacitor 14. After this charge becomes sufficient, the impedance of non-linear reactor 10 is reduced and capacitor 14 discharges through transformer ICT, to energize ignitors 7 in known manner. Reactor 12 being linear prevents a discharge of capacitor 14 back into the phase shift circuit. Since the circuit means or ignitor firing circuit 8 as described thus far is preponderantly inductively reactive, and since a phase shift circuit such as is disclosed in the above mentioned Price disclosure requires a leading power factor, the capacitor 13 is utilized for this purpose.

Holding anodes 5 are energized from transformer 14 which is energized from the conductors $a$ and $b$. As is well known, the circuit interconnecting the secondary winding of transformer 14 and auxiliary or holding electrodes 5 is provided with unidirectional conducting devices 15. Thus, when a cathode spot is established by the ignitors 7, the spot will be maintained due to the action of auxiliary electrodes 5 as is well known.

In the drawing we have represented a circuit such as the firing or control circuit 8 by the components designated by the numerals 16 and 17 respectively. It will be understood that the control or firing circuits 16 and 17 would be arranged with respect to their associated two tubes in a manner identical to that in which the tubes 1 and 2 are connected with respect to the firing circuit 8.

The transformers generally designated by the numerals 18 and 19 correspond to the auxiliary or holding anode supply transformer 14 and, of course, would be used in conjunction with their associated two tubes and would be connected as is indicated in conjunction with tubes 1 and 2 above.

For the purpose of detecting misfires in the ignitrons, the misfire detecting means represented by a block diagram on the drawing would be used. As has already been indicated, this misfire detector could be of the type disclosed in the above mentioned Mittag application, Serial No. 778,593.

As is disclosed in this Mittag application, the misfire detecting circuit is connected to respond to a failure of current flow in the auxiliary anode circuits of the ignitron tubes. As is indicated in the drawing, a resistor 20 is connected in series with the energizing circuit for the holding anode of the ignitron tube 2, while a resistor 21 is arranged in series with the energizing circuit for the holding anode of ignitron tube 1. Thus, if a misfire occurs in tubes 1 or 2, current would fail to flow through resistors 20 and 21 as the case might be, and such failure of current flow would, for predetermined conditions, cause the relay 22 to elevate its armature and close its contacts. It will be understood that the misfire detecting circuit would be interconnected with suitable resistors in series with the energizing circuit for each holding anode so that suitable response would be obtained if a misfire condition occurred in any one of the six ignitrons which would comprise a 3 phase arrangement.

Operation of relay 22 would cause a short circuit to be placed across the terminals of each ignitor coupling transformer ICT when the bridging contacts 23, 24, and 25 engage the associated fixed contacts of relay 22. Thus, with the ignitor coupling transformers effectively short circuited, no energy could be supplied to the ignitors 7 and as a result, all the ignitrons would be held off.

Operation of relay 22 through its bridging contact 26 also causes control means comprising relay 27 to close its contacts. When the contacts of relay 27 are closed, a circuit would be completed through the impedance means comprising resistor R, capacitor C and reactance L from one of the conductors $a$, $b$, or $c$ to another of these conductors.

Thus it will be understood that if suitable values for resistance R, capacitance C and reactance L are chosen, the impedance of the circuit energized by each phase of the output of the phase shift circuit would be substantially the same as the impedance of the corresponding circuit means or firing circuit such as 8, 16 or 17. Thus, during the period when the transformers ICT are short circuited, a load on the phase shift circuit would be maintained which would have substantially the same characteristics as the firing circuits and there would be no material disturbance in the voltage and phase relationships during this period.

As soon as the disturbance causing misfiring is removed, the misfire detector would promptly cause the relay 22 to open its contacts thereby reconnecting the transformers ICT into the circuit. Immediately after relay 22 operates, relay 27 is promptly de-energized and the impedance means comprising the components R, C and L are disconnected. As a practical matter, the R, C, and L circuits would be disconnected in such a short time after the removal of the short circuit from around the transformer ICT that the voltage and phase relationships of the output from the phase shift circuit would not be altered materially. Thus after the arc suppressing period is over, the condition of the control or firing circuits is such that the phase shift circuit begins to operate properly without appreciable delay and without any undue advance in the ignitor firing angle. In this way the desired voltage output of the ignitrons can be maintained even during the period immediately following a misfire or fault condition.

While the short circuiting arrangement for the firing or control circuits as shown and described above is applied directly across the terminals of the transformers ICT, it will be understood that this short circuit could be applied elsewhere. For example, the short circuit could be applied directly across the terminals of the capacitor 14, provided suitable impedance means were also included in series with the contacts 23, 24, and 25 of the suppressing circuit. Furthermore, the arrangement as shown and described above utilizes the holding anode resistors 20 and 21 as a means for indicating misfire. If desired, other suitable means could be used for this purpose without departing from the invention.

If desired the impedance circuits R, C, and L could be used to perform some added function. For example, the resistances R could be in the form of indicating lamps which would serve as a ready means of indicating the existence of an abnormal condition.

While we have shown and described a particular embodiment of the invention, we do not wish to be limited thereto, and intend in the appended claims to cover all such changes and modifications as fall within the true spirit and scope of the invention.

What we claim as new and desire to secure by Letters Patent of the United States is:

1. In combination, a plurality of electronic devices of the ionizable medium type each device having an anode, a cathode, and an ignitor, circuit means for energizing said ignitors, a phase shift circuit for energizing said circuit means, detecting means responsive to predetermined conditions of said devices for rendering said circuit means ineffective operably to energize said ignitors, impedance means, and control means responsive to operation of said detecting means for causing said impedance means to be energized by said phase shift circuit, the characteristics of said impedance means being such that the characteristics of the load on said phase shift circuit are substantially the same after operation of said control means as the characteristics of the load on said phase shift circuit before operation of said detecting means.

2. In combination, a plurality of electronic devices of the ionizable medium type each device having an anode, a cathode, and an ignitor, circuit means for energizing said ignitors, a phase shift circuit for energizing said circuit means, detecting means responsive to predetermined misfire conditions of said devices for rendering said circuit means ineffective operably to energize said ignitors, impedance means having predetermined characteristics, and control means responsive to operation of said detecting means for causing said impedance means to be energized by said phase shift circuit, said control means being effective to cause deenergization of said impedance means after the cessation of said predetermined misfire conditions and after said circuit means is again rendered operable by said detecting means.

3. In combination, a plurality of electronic devices of the ionizable medium type each device having an anode, a cathode, an ignitor element, and an auxiliary electrode, circuit means for energizing said ignitor elements, auxiliary circuit for energizing each of said auxiliary electrodes, phase shift means for energizing said circuit means, detecting means connected with said auxiliary circuits and operable in response to predetermined misfire conditions thereof for rendering said circuit means ineffective operably to energize said ignitor elements, normally deenergized impedance means, a relay controlled by said detecting means and operable to cause energization of said impedance means from said phase shift means after operation of said detecting means, said impedance means being constructed so that the characteristics of the load energized by said phase shift circuit after operation of said relay are substantially the same as the characteristics of said circuit means, and said relay being effective to cause deenergization of said impedance means after normal firing conditions are restored following said predetermined misfire conditions.

CARL C. HERSKIND.
MARVIN J. MULHERN.

No references cited.